Aug. 9, 1966 D. C. FERGUSON 3,265,991
SILICON CONTROLLED RECTIFIER CHOPPER CIRCUIT
Filed Jan. 29, 1964
2 Sheets-Sheet 1

INVENTOR.
DONALD C. FERGUSON
BY Robert J. Haase
ATTORNEY

INVENTOR.
DONALD C. FERGUSON
BY Robert J. Haase
ATTORNEY

United States Patent Office 3,265,991
Patented August 9, 1966

3,265,991

SILICON CONTROLLED RECTIFIER CHOPPER CIRCUIT

Donald C. Ferguson, Scottsdale, Ariz., assignor to Sperry Rand Corporation, Great Neck, N.Y., a corporation of Delaware Filed Jan. 29, 1964, Ser. No. 340,978
3 Claims. (Cl. 331—111)

The present invention generally relates to chopper circuits for providing recurrent pulses of direct current from a direct current source and, more particularly, to a chopper circuit utilizing a silicon controlled rectifier and other solid state components for producing output pulses of direct current whose repetition rate and pulse duration are readily controllable.

The use of silicon controlled rectifiers is well-known in inverters, i.e., circuits for producing an output pulsed signal (having alternating components) in response to direct current exictation. Briefly, the silicon controlled rectifier is connected in series circuit between a direct current source and the load which is to be supplied with pulsed current. The rectifier is made conductive by the application of a small signal to its so-called "gate" electrode. Once begun, conduction continues whether or not the signal is removed from the gate electrode. Conduction may be terminated either by the removal or by the reversal of the potential applied between the cathode and anode electrodes of the silicon controlled rectifier. The reversal of the potential is advantageous because that technique substantially reduces the "turn off" time. Accordingly, numerous techniques have been proposed in the art for generating a "turn off" signal of proper (reversed) polarity for application to the cathode and anode electrodes of the rectifier when conduction is to be terminated. Varying degrees of complexity are involved depending upon the magnitude of the direct current to be interrupted, the repetition rate of the interruptions, the duration of the interruptions, and the ease with which it is desired to control said repetition rate and duration.

One object of the present invention is to provide a simplified chopper circuit for repetitively interrupting large direct currents for controllable lengths of time and at controllable repetition intervals.

Another object is to provide a self actuating current interrupting circuit utilizing solid state components in which the repetition rate and the duration of the current interruptions are separately controllable.

These and other objects of the present invention as will be seen from a reading of the following specification are achieved by the provision of a silicon controlled rectifier having cathode and anode electrodes connected in series circuit with a source of direct current and a load which is to be supplied with direct current pulses of controllable repetition rate and duration. One terminal of a capacitor is connected to the junction between the rectifier and the load. The other capacitor terminal is connected to an impedance element in a unijunction transistor relaxation oscillator circuit.

In a first embodiment of the invention, the aforementioned impedance element also is coupled to the gate electrodes of the silicon controlled rectifier. In the operation of the first embodiment, the unijunction oscillator produces a series of recurrent pulses across the aforesaid impedance element. Alternate ones of the pulses trigger the rectifier into a state of conduction. During the times that the rectifier conducts, the capacitor is charged substantially to the potential of the direct current source. The polarity of the potential is opposite that which is required to sustain rectifier conduction. Each of the intervening alternate pulses from the oscillator adds to the potential of the charged capacitor to produce a resultant potential of sufficient amplitude to reverse bias the anode and cathode electrodes of the silicon controlled rectifier. The reverse bias quickly terminates rectifier conduction for a period sufficient to restore control to the gate electrode. A feature of the first embodiment is that the duration of each conduction interval of the silicon controlled rectifier is determined by feedback from the load to the unijunction relaxation oscillator.

In a second embodiment of the invention, a pair of unijunction oscillator circuits are provided separately to produce a first recurrent series of pulses to trigger the rectifier into conduction and a second recurrent series of pulses to block rectifier conduction. As in the case of the first embodiment, the cathode and anode electrodes of the rectifier are connected in series circuit with the load across a direct current supply and one terminal of a capacitor is connected to the junction between the rectifier and load. In the case of the second embodiment, however, solely the other capacitor terminal is connected to an impedance in the "turn off" oscillator circuit. A corresponding impedance element in the "turn on" oscillator circuit is connected to the gate electrode of the silicon controlled rectifier. A feature of the second embodiment is that the "off" relaxation oscillator receives its excitation through the silicon controlled rectifier. Consequently, each of the "off" pulses is synchronized to each occurrence of conduction of the rectifier. Each occurrence of rectifier conduction, on the other hand, is synchronized to the first relaxation oscillator operation. Thus, the "off" relaxation oscillator operation is synchronized with the "on" oscillator.

For a more complete understanding of the present invention, reference should be had to the following specification and to the appended figures of which:

Figure 1:
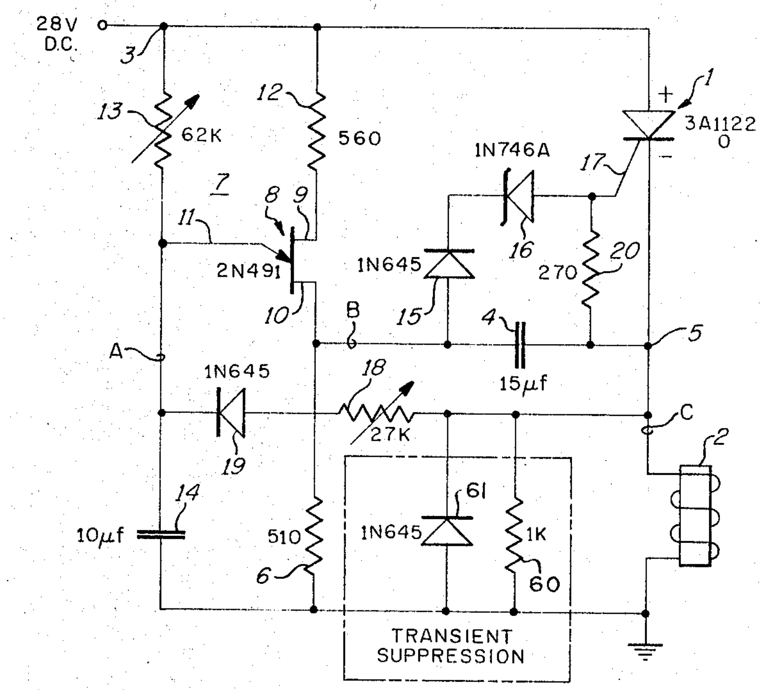
FIGURE 1 is a schematic diagram of a first embodiment of the invention in which the same relaxation oscillator circuit produces both the "on" and the "off" rectifier pulses.

Referring to FIGURE 1, the cathode and anode electrodes of silicon rectifier 1 are connected in series circuit with a load represented by relay 2 across a source (not shown) of direct current which is connected between terminal 3 and ground. One terminal of capacitor 4 is connected to the junction 5 between rectifier 1 and load 2. The other terminal of capacitor 4 is connected to resistor 6 of unijunction relaxation oscillator circuit 7. The oscillator 7 further comprises unijunction transistor 8 having bases 9 and 10 and emitter 11. Base 9 is connected to voltage source 3 through resistor 12, emitter 11 is connected to source 3 through resistor 13 and to ground by capacitor 14. Base 10 is connected to ground through resistor 6.

In the operation of oscillator 7, capacitor 14 charges toward the potential of terminal 3 through resistor 13. When the charge across capacitor 14 reaches the potential required to fire transistor 8, capacitor 14 discharges through the emitter 11 and base 10 of transistor 8 to produce a positive-going pulse across resistor 6. The positive-going pulse is coupled to the gate electrode of rectifier 1 through diode 15 and Zener diode 16. In the absence of any back-bais, diode 15 passes positive-going pulses from resistor 6 to gate electrode 17. Zener diode 16 isolates gate electrode 17 from the small positive potential that is developed across resistor 6 during the times when capacitor 14 is not discharging through transistor 8.

Upon the application of a positive-going pulse from resistor 6 to the gate electrode 17, rectifier 1 is rendered conductive connecting load 2 to the direct current source. The aforesaid pulse also is coupled by capacitor 4 to the cathode of rectifier 1 but does not adversely affect the firing of the rectifier because of the short time constant presented by capacitor 4 and the impedance of load 2. During the time that rectifier 1 is rendered conductive, capacitor 4 charges via resistor 6 to the potential developed across load 2 which is substantially equal to the potential of the direct current source applied between terminal 3 and ground. When the potential of capacitor 14 drops below the value required to sustain its discharge through the emitter 11 and base 10 of unijunction transistor 8, transistor 8 reverts to its "off" condition. Capacitor 14 then commences to recharge simultaneously through two parallel paths. Capacitor 14 charges through resistor 13 toward the potential at terminal 3 at the same time that it charges toward the substantially identical potential at terminal 5 through the path provided by resistor 18 and diode 19. As mentioned earlier, terminal 5 is substantially at the potential of terminal 3 during the time that rectifier 1 is conducting. Diode 19 is poled to couple capacitor 14 to terminal 5 during said time.

The additional charging path provided by resistor 18 and diode 19 reduces the charging time constant of capacitor 14 relative to the time constant obtaining prior to the initial firing of unijunction transistor 8. Consequently, the potential across capacitor 14 rises more rapidly to the potential required to break down transistor 8 a second time. Capacitor 14 again discharges through the emitter 11 and the base 10 of transistor 8 to produce a second positive-going pulse across resistor 6. Said second pulse adds to the potential of charged capacitor 4 to provide a total potential sufficient to back-bias the anode and cathode electrodes of rectifier 1 and rapidly cut off conduction to restore control to the gate electrode 17. The second positive pulse is blocked from gate electrode 17 by diode 15 which is back-biased during the conduction of rectifier 1 by the positive potential developed at point 5 which is coupled via resistor 20 and Zener diode 16 to the cathode of diode 15. When rectifier 1 is cut off, the capacitor 4 quickly discharges through the path provided by resistor 6 in series with the parallel combination of resistor 60 and relay 2. Following the discharge of capacitor 4, diode 19 becomes reverse-biased and a new cycle of operation begins with the charging of capacitor 14 through resistor 13. The transient suppression network comprising resistor 60 and diode 61 protects against high induced voltages during the interruption of current through the inductive load 2.

Figure 2:
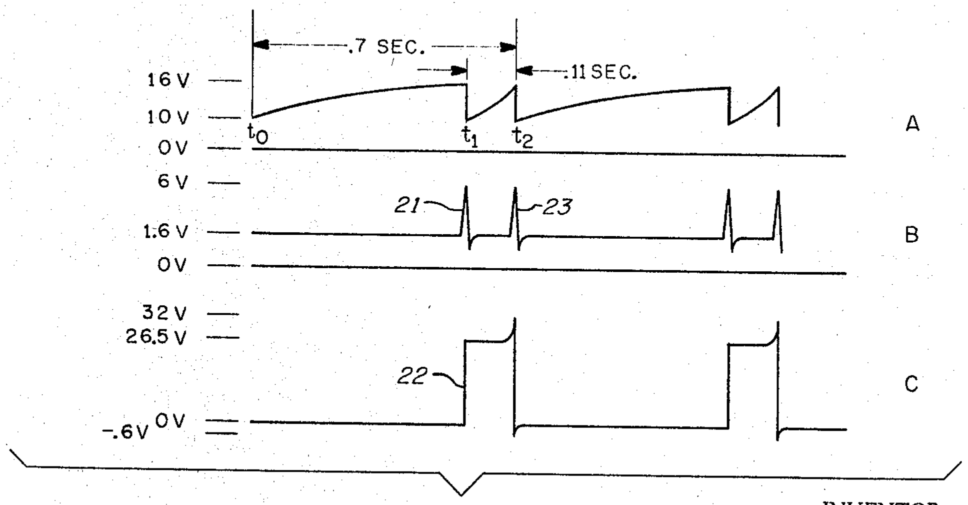
FIGURE 2 is a series of idealized waveforms illustrating the operation of the first embodiment.

The operation just described can be better understood with the aid of FIGURE 2. Waveform A of FIGURE 2 represents the potential across capacitor 14 which rises exponentially during the time from $t_0$ to $t_1$ until the firing potential of transistor 8 is reached. Capacitor 14 then quickly discharges to a lower value at which the conduction of transistor 8 is extinguished. Immediately thereafter, capacitor 14 begins to recharge again but at a higher rate due to the extra charging path provided by resistor 18 and diode 19 which was blocked during the time interval from $t_0$ to $t_1$. Capacitor 14 charges rapidly during the time from $t_1$ to $t_2$ until the firing potential of transistor 8 is reached a second time and the first charging cycle starts again.

The discharging of capacitor 14 at times $t_1$ and $t_2$ produces the positive going voltage pulses 21 and 23 of waveform B across resistor 6. The first pulse 21 turns the silicon controlled rectifier 1 "on" to initiate the voltage pulse 22 of waveform C in load 2. The second pulse 23 extinguishes conduction of rectifier 1 to terminate load pulse 22. The repetition interval of the load pulse 22 may be adjusted by varying the resistance of resistor 13 whereas the duration of the load pulse may be controlled by varying the resistance of resistor 18. To a small degree, the adjustment of resistor 13 also effects the duration of the load pulse and the adjustment of resistor 18 also alters the repetition interval of the load pulse.

Figure 3:
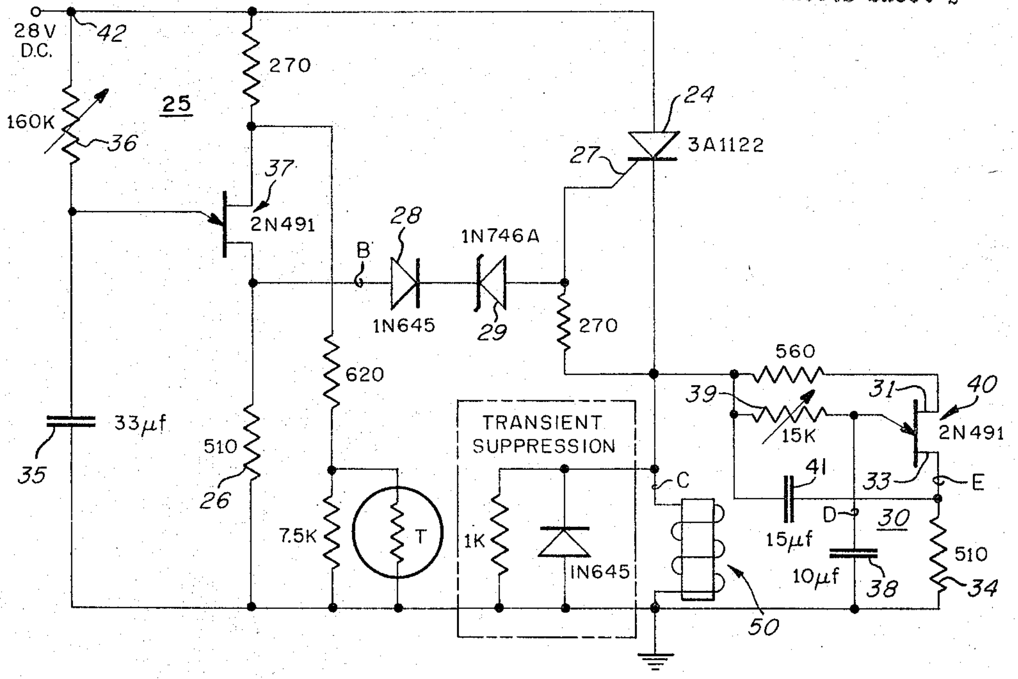
FIGURE 3 is a schematic diagram of a second embodiment of the invention in which the "on" and "off" pulses are produced by separate but synchronized relaxation oscillators.

In the second embodiment of the present invention represented in FIGURE 3, separate source of "on" and "off" pulses are provided for controlling the repetition interval and the duration of the firings of the rectifier independently of each other. The "on" pulse for firing rectifier 24 is generated by unijunction relaxation oscillator 25 which is similar in structure and operation to oscillator 7 of FIGURE 1. The positive-going pulses produced across resistor 26 are coupled exclusively to the gate electrode 27 of rectifier 24 via diode 28 and Zener diode 29. Unlike the case with the embodiment of FIGURE 1, however, the same pulses are not utilized for extinguishing the conduction of the rectifier. The "off" pulses are provided instead by unijunction relaxation oscillator 30 whose bases 31 and 33 are coupled between the cathode of rectifier 24 and ground, base 33 being connected to ground via resistor 34. It will be observed that oscillator 30 is energized synchronously with the initiation of conduction of rectifier 24.

As in the case of the embodiment of FIGURE 1, direct current is applied simultaneously to rectifier 24 and to relaxation oscillator 25. Capacitor 35 charges through resistor 36 to the peak point emitter potential of transistor 37 at which voltage transistor 37 breaks down to generate a positive going voltage pulse across resistor 26. Said pulse is applied to the gate electrode of rectifier 24 and initiates conduction therein. When rectifier 24 conducts, a direct potential is applied simultaneously to load 50, to the "off" relaxation oscillator 30, and to the series connected capacitor 41 and resistor 34. Capacitor 41 quickly charges toward the potential across load 50 which potential is substantially equal to the potential of the direct current source applied to terminal 42. Upon the application of excitation to oscillator 30, capacitor 38 charges through resistor 39 to the peak point emitter voltage of transistor 40. Upon the firing of transistor 40, a positive going pulse is produced across resistor 34 and is coupled via charged capacitor 41 to the cathode of rectifier 24. The potential sum of the pulse developed across resistor 34 and the charge across capacitor 41 is sufficient to back-bias the anode and cathode electrodes of rectifier 24 to terminate its conduction.

Figure 4:
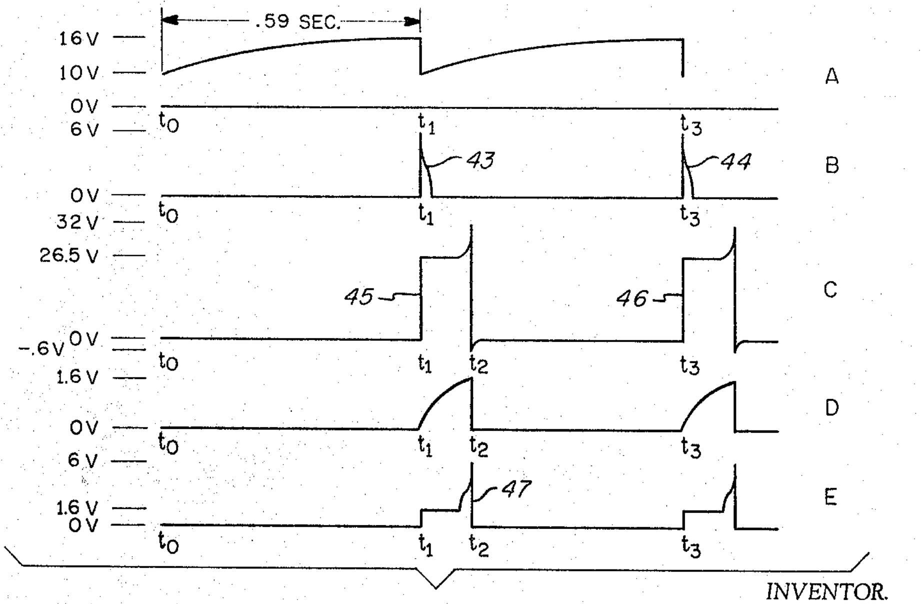
FIGURE 4 is a series of idealized waveforms illustrating the operation of the second embodiment.

The action just described is manifested by the waveforms of FIGURE 4. Waveform A of FIGURE 4 represents the potential developed across capacitor 35 which rises exponentially during the interval from $t_0$ to $t_1$. Upon reaching the firing potential of transistor 37 at time $t_1$, capacitor 35 rapidly discharges to a reduced voltage level at which the conduction of transistor 37 is terminated. The same charging cycle of capacitor 35 repeats during the time interval from $t_1$ to $t_3$. Each firing of transistor 37 produces a positive-going voltage pulse across resistor 26 as represented by pulses 43 and 44 of waveform B. Each of the pulses 43 and 43 fires silicon controlled rectifier 24 to initiate a respective one of the voltage pulses 45 and 46 of waveform C across load 50.

Immediately upon the firing of rectifier 24, excitation is applied to unijunction relaxation oscillator 30 permitting capacitor 38 to charge during the time interval from $t_1$ to $t_2$ as shown in waveform D. Capacitor 38 continues to charge until the firing potential of transistor 40 is reached. Capacitor 41 also charges to the potential developed across load 50 during the same time interval from $t_1$ to $t_2$. Upon the firing of transistor 40, a positive-going pulse 47 is produced across resistor 34. The potential of pulse 47 adds to the charge across capacitor 41 to back-bias the anode and cathode electrodes of rectifier 24 for a period of time sufficient to extinguish conduction and restore control to gate electrode 27. The blocking of rectifier 24 removes the excitation potential from oscillator circuit 30. Circuit 30 remains dormant until the next successive firing of rectifier 24 which occurs at time $t_3$. The repetition interval of load pulses 45 and 46 may be adjusted by varying the resistance of resistor 36 whereas the duration of the load pulse may be controlled by adjusting the resistance or resistor 39.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A chopper circuit comprising
a source of direct current,
a load,
a silicon controlled rectifier having cathode, anode and gate electrodes,
means for applying a pulse to said gate electrode to turn on said silicon controlled rectifier,
said cathode and anode electrodes being connected in series circuit with said source of direct current and said load,
a capacitor,
and an oscillator having an impedance element across which a voltage pulse is produced upon each cycle of the oscillator,
said capacitor being connected in series with said impedance element in shunt across said load,
said capacitor charging through said impedance element toward the potential developed across said load when said silicon controlled rectifier is turned on, said voltage pulse adding to the charge of said capacitor to reverse-bias the cathode and anode electrodes of said silicon controlled rectifier thereby to turn off said silicon controlled rectifier.

2. A chopper circuit as defined in claim 1 wherein said means for applying a pulse to said gate electrode to turn on said silicon controlled rectifier includes a second oscillator different from said oscillator having said impedance element.

3. A chopper circuit as defined in claim 1 wherein said oscillator is connected to receive excitation from said source of direct current only through said cathode and anode of said rectifier whereby said oscillator is operative to produce said voltage pulse only when said rectifier is turned on.

References Cited by the Examiner

UNITED STATES PATENTS

| | | | |
|---|---|---|---|
| 3,132,264 | 5/1964 | Dahme | 307—88.5 |
| 3,177,418 | 4/1965 | Meng | 307—88.5 |
| 3,184,665 | 5/1965 | Wright | 331—11 X |

FOREIGN PATENTS

| | | |
|---|---|---|
| 1,334,670 | 7/1963 | France. |

OTHER REFERENCES

Westinghouse SCR Designer's Handbook, pages 7–94, 7–95, 7–96, 7–97, pub. September 1963, reprinted April 1964.

ROY LAKE, *Primary Examiner.*

J. KOMINSKI, *Assistant Examiner.*